March 21, 1967 E. METCALF 3,309,754

SELF-REGULATING LIGHT-RESPONSIVE DEVICES

Original Filed Sept. 15, 1961 2 Sheets-Sheet 1

Inventor
ERIC METCALF
By Cameron, Kerkam & Sutton
Attorneys

SELF-REGULATING LIGHT-RESPONSIVE DEVICES

Original Filed Sept. 15, 1961 2 Sheets-Sheet 2

INVENTOR
ERIC METCALF
BY Cameron, Kerkam & Sutton
ATTORNEYS

United States Patent Office 3,309,754
Patented Mar. 21, 1967

3,309,754

SELF-REGULATING LIGHT-RESPONSIVE DEVICES

Eric Metcalf, 12 Glebe Road, Headley Bordon, England

Continuation of application Ser. No. 138,503, Sept. 15, 1961. This application May 26, 1965, Ser. No. 465,234
Claims priority, application Great Britain, Sept. 23, 1960, 32,710/60
10 Claims. (Cl. 28—64)

This is a continuation of application Ser. No. 138,503, filed Sep. 15, 1961, now abandoned.

The present invention relates to a self-regulating light-responsive device.

Many types of light-responsive devices are known, usually employing a light source in conjunction with a light-sensitive element, e.g. a photo-electric cell, to deliver electrical output signals. These devices are used to control associated apparatus by the variations in the output signals from a predetermined level due to the partial or complete obstruction of the light beam by the object to be detected. However in practice variations in the output signals may occur due to other causes such as ageing of the light source or light sensitive element, or obstruction of the light beam by dust or similar material. These extraneous variations are undesirable since they may lead to errors in the operation of the associated apparatus.

According to the present invention there is provided a self-regulating light-responsive device responsive to variations in the intensity of light received from a source to deliver electrical output signals indicative of such variations, which device includes compensating means operable to compensate for variations in intensity which exceed a predetermined time duration.

Figure 1:
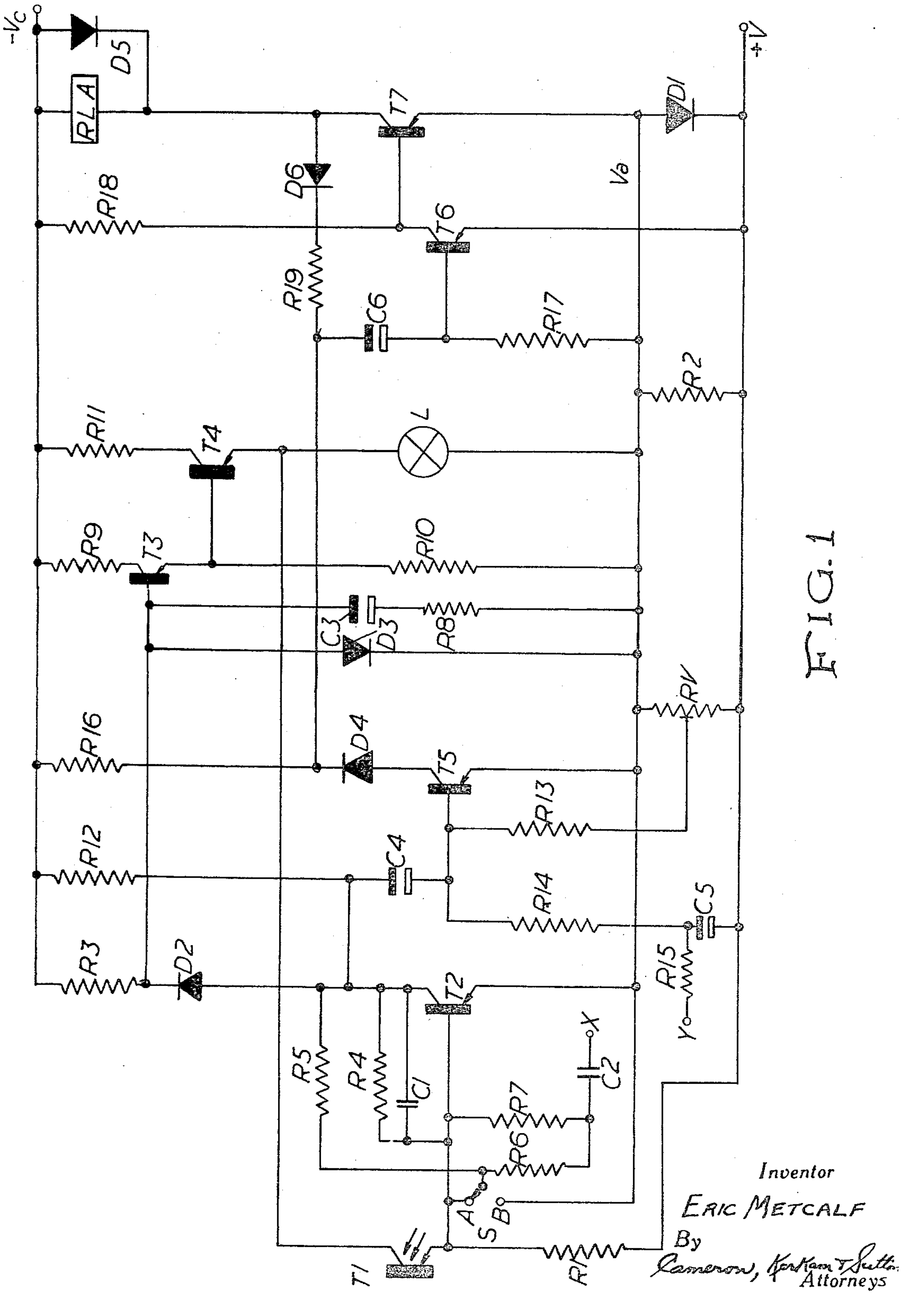
Figure 2:
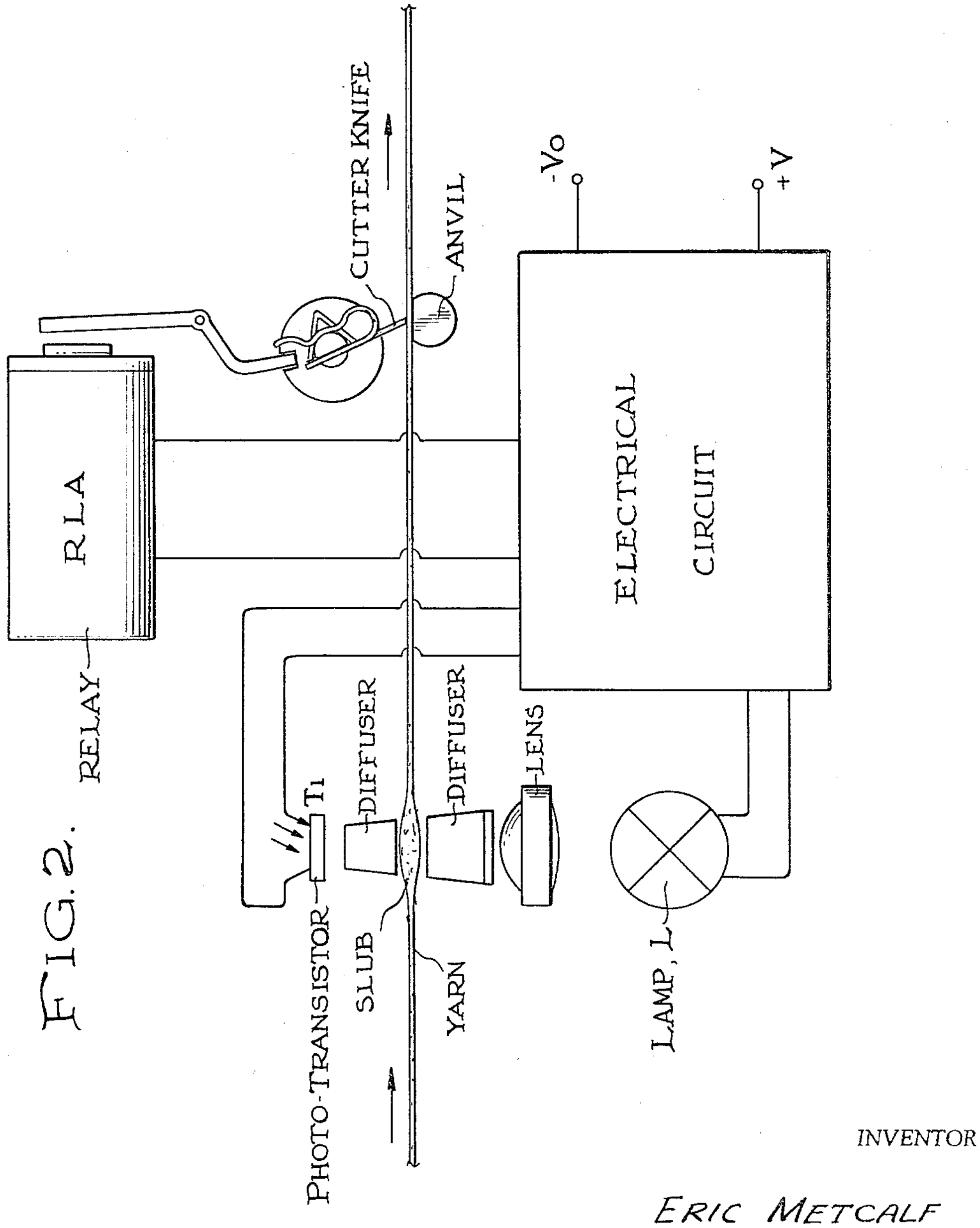

One embodiment of the invention, a device for detecting irregularities or so-called "slubs" in spun yarn, will now be described by way of example, with reference to the accompanying drawing wherein:

FIG. 1 is a diagram of the electrical circuit of a yarn slub detector incorporating the invention; and FIG. 2 is a diagrammatic showing of the structural arrangement of the components of a yarn slub detector embodying the electrical circuit of FIG. 1.

Referring now to the drawing, a photo-transistor T1, used with its base disconnected, has its collector connected to one side of a lamp L. The emitter is connected through a resistor R1 to a potential +V, and also to the base of a first amplifying transistor T2. The emitter of T2 is connected to a potential V*a*, which potential is maintained by a Zener diode D1 connected between potentials +V and V*a* in parallel with a resistor R2. The collector of T2 is connected through a diode D2 connected as shown in series with a resistor R3 to a potential —V*c*. Between the base and collector of T2 is connected a gain stabilising resistor R4 in parallel with a capacitor C1. Further resistors R5, R6 and R7 are connected in series between the base and collector of T2. The junction of R5 and R6 is taken to the pole of a two-way switch S having positions A and B. In position A the junction of R5 and R6 is connected to the base of T2, and in position B it is connected to the potential V*a*. A capacitor C2 is connected between the junction of R6 and R7 and a terminal X.

The junction of diode D2 and resistor R3 is connected to the base of a transistor T3 and to potential V*a* through a diode D3 and through a delay circuit which comprises capacitor C3 in series with a resistor R8. The collector of T3 is connected through resistor R9 to potential —V*c*. The emitter of T3 is connected to potential V*a* through resistor R10 and to the base of a control transistor T4. The collector of T4 is connected to potential —V*c* through resistor R11, whilst the emitter is connected to one side of the electric lamp L, this also being connected to the collector of the photo-transistor T1, as above mentioned. The other side of lamp L is connected to potential V*a*.

The collector of transistor T2 is connected through a resistor R12 to potential —V*c* and through a capacitor C4 to the base of a discriminator transistor T5. The base of T5 is also connected through a resistor R13 to the slider of a potentiometer RV connected between potentials +V and V*a*, and through resistors R14 and R15 to a terminal Y. The junction of R14 and R15 is connected through a capacitor C5 to potential +V.

The emitter of transistor T5 is connected to potential V*a*, and the collector is connected through a diode D4 in series with a resistor R16 to potential —V*c*. The junction of D4 and R16 is connected through a capacitor C6 to the base of a transistor T6. The base of T6 is also connected to potential V*a* through a resistor R17. The emitter of T6 is connected to potential +V whilst the collector is connected to the base of a switching transistor T7 and through resistor R18 to potential —V*c*.

The emitter of T7 is connected to potential V*a*, and the collector is connected through a relay coil RLA in parallel with a diode D5 to potential —V*c*. The collector of T7 is also connected through diode D6 in series with resistor R19 to the junction of C6, D4 and R16.

The photo-transistor T1 responds to all variations in received light, whatever the magnitude or duration of these variations, and delivers corresponding output signals to the base of the ampifier transistor T2. The gain of this amplifier stage can be changed by the switch S. In this way the detector can be made more or less sensitive so as to operate on yarns of differing diameter. Resistor R4 and capacitor C1 provide feedback to stabilise the gain of the amplifier and also to determine the minimum pulse length to which the detector will respond. The output from T2 is applied through diode D2 to the base of transistor T3, and also to a capacitor C4.

Transistor T3 forms an emitter-coupled amplifier stage which controls the current flowing through the lamp control transistor T4. Pulses of short duration, caused by slubs in the yarn under test are of too short duration to charge capacitor C3 of the said delay circuit, and thus no significant change in potential occurs on the base of transistor T3. However, a pulse of sufficiently long duration to charge capacitor C3 changes the potential on the base of T3. This in turn changes the base potential of T4, and alters the voltage across the lamp L to compensate for the change in output from the photo-transistor T1.

The discriminator transistor T5 is normally nonconducting by virtue of a bias potential applied to its base from terminal Y. The bias potential can have any value between +V and V*a*, and small adjustments may be made with potentiometer RV. Capacitor C5 and resistor R15 form a filter to remove any noise voltages appearing on the bias voltage. Changes in potential on the collector of T2 are applied to a capacitor C4. This capacitor, with resistor R14, determines the minimum rate of changes of yarn diameter which will operate the detector. The bias potential applied to the base of T5 determines the magnitude of the change in potential, and thus the minimum diameter of the slub required to operate the detector. Only when the change in potential applied to C4 exceeds the bias potential will transistor T5 start to conduct.

The transistors T6 and T7 provide a transistor D.C. power amplifier, in which transistor T6 is normally conducting, holding the base of the output transistor thereof, T7, positive with respect to its emitter, and thus this transistor is normally non-conducting.

Consider now the instant when a slub in the yarn under test reduces the intensity of the light falling on the photo-transistor T1. The current through the photo-transistor will be reduced and thus the potential at the emitter of T1 will rise to a more positive value. This rise in potential is applied to the base of the first amplifier transistor T2, causing less current to flow through the transistor. The fall in potential produced at the collector of T2 is applied to diode D2 and to capacitor C4. If the magnitude of the fall in potential is large, diode D2 becomes non-conducting thus preventing the pulse from being clipped by diode D3. If, however, the fall in potential is of small magnitude, diode D2 conducts and applies the fall in potential to capacitor C3. Since the change in potential is of relatively short duration, the potential on the base of transistor T3 does not change appreciably, and thus the lamp voltage does not change.

If the fall in potential applied to the capacitor C4 from the collector of T2 is sufficient to overcome the bias potential applied to the base of T5, then T5 will conduct for the duration of the pulse caused by the slub. If, however, the fall in potential is smaller than the bias potential then T5 will remain non-conducting.

A pulse of sufficient magnitude to cause T5 to conduct is amplified and applied to the base of transistor T6 through diode D4 and capacitor C6, in the form of a positive-going pulse. This causes T6 to become non-conducting thus taking the base of switching transistor T7 more negative, causing T7 to conduct. Current then flows through the coil RLA, operating the relay. The relay may perform several functions such as cutting or marking the yarn, and stopping the machine on which the yarn is being used.

When transistor T7 conducts its collector is almost at potential V*a*. This potential is applied to the junction of D4 and R16, and diode D4 prevents the potential being applied to transistor T5.

Transistor T6 is held non-conducting by the potential applied to its base through D6, R19, and C6. C6 charges slowly through R17 until T6 again conducts, causing T7 to become non-conducting.

Capacitor C6 is used to hold T7 switched on for sufficient time to ensure operation of the relay RLA.

The accumulation of dust in the optical system, or ageing of the lamp or photo-transistor are events which normally occur very slowly. They all result in a reduction in current flowing through the photo-transistor T1. Capacitor C4, which determines the maximum pulse length which will operate the discriminator T5, ensures that these slow changes do not operate the detector. The changes are of long duration and thus reduce the base potential of T3, operating the lamp control circuit to compensate for the reduction in photo-transistor current.

Removal of dust from the optical system may produce a sudden increase in output from the photo-transistor, but this increased current produces a negative-going pulse which does not affect the discriminator. If the changes persists for a sufficient time, T3 and T4 will separate to reduce the output from the lamp L to compensate for the increase in current through T1.

Terminal X, connected to the base of T2 through C2 and R7 is for the application of a test pulse. The amplitude of the test pulse is conveniently arranged to be proportional to the bias potential so that the test pulse always operates the detector. Both bias voltage and test pulse will thus be derived from the sale source. The test pulse is used to set up a series of detectors to operate on the same slub dimensions, adjustments being carried out by potentiometers RV. Resistor R6 reduces the amplitude of the test pulse to correct for the increased gain of T2 with switch S in position B.

The characteristics of the photo-transistor T1 will, of course, change with temperature, and any suitable means of temperature compensation may be applied.

Although the above embodiment describes the application of the invention to apparatus for detecting the presence of enlargements in spun yarn, it may be similarly applied to any apparatus operating on the obstruction of a light beam.

What is claimed is:

1. A yarn slub detector comprising an optical system having a lamp and a cooperating photo-sensitive device between which yarn may be drawn, a first transistor amplifier responsive to variations in the output from said photo-sensitive device which exceed a determined time duration for controlling the current through said lamp, and discriminator means for detecting short term variations in the output from said photo-sensitive device which result from the passage of an irregularity in said yarn through said optical system and for delivering electrical output signals indicative of such short term variations.

2. A yarn slub detector according to claim 1 which includes a transistor D.C. power amplifier having an output transistor, and wherein said lamp is connected in series with the collector/emitter circuit of said output transistor.

3. A yarn slub detector comprising an optical system having a lamp and a cooperating photo-sensitive device between which yarn may be drawn, a source of potential, a first transistor amplifier responsive to variations in the output from said photo-sensitive device, a D.C. power amplifier responsive to such of said variations which exceed a predetermined time duration and for controlling the current through said lamp, said amplifier having an output transistor and said lamp being connected in series between said sources of potential and the emitter electrodes of said output transistor, and discriminator means for detecting short term variations in the output from said photo-sensitive device which results from the passage of an irregularity in said yarn through said optical system and for delivering electrical output signals indicative of said short term variations.

4. A yarn slub detector according to claim 1 wherein said discriminator means includes a transistor, and means for applying a bias potential to said transistor which normally biases the latter to non-conduction, said transistor being rendered conductive by signals from said photo-sensitive device which overcome said bias potential.

5. A yarn slub detector according to claim 4 including means for varying the bias potential applied to said transistor.

6. A yarn slub detector according to claim 1 including a further transistor amplifier for amplifying the output from said discriminator means, and a relay operable by the amplified output from said further transistor amplifier.

7. A yarn slub detector according to claim 6 including a yarn cutter controlled by said relay.

8. A yarn slub detector according to claim 1 including a delay circuit for determining said predetermined time duration of the variations in the output from said photo-sensitive device to which said first transistor amplifier is responsive.

9. A yarn slub detector according to claim 8 wherein said delay circuit includes a capacitor connected between said first transistor amplifier and said D.C. power amplifier operable to apply the electrical output signals from said device to said amplifier only when said signals are affective to substantially change the potential difference across said capacitor.

10. A yarn slub detector according to claim 9 wherein said delay circuit includes a resistor connected in series with said capacitor.

References Cited by the Examiner

UNITED STATES PATENTS

| | | | |
|---|---|---|---|
| 2,548,755 | 4/1951 | Vossberg et al. | 250—219 |
| 2,927,217 | 3/1960 | Vacca | 250—219.3 |
| 2,936,511 | 5/1960 | Wilson | 28—64 |
| 3,030,853 | 4/1962 | Strother | 250—219.3 |
| 3,053,986 | 9/1962 | Loepfe et al. | 259—219.3 |
| 3,128,384 | 9/1964 | Nelson | 250—205 |

MERVIN STEIN, *Primary Examiner.*

DONALD M. PARKER, *Examiner.*

L. K. RIMRODT, *Assistant Examiner.*